G. E. PRITCHARD.
PEA THRESHER AND HARVESTER.
APPLICATION FILED DEC. 29, 1913.

1,117,904.

Patented Nov. 17, 1914.

3 SHEETS—SHEET 1.

WITNESSES

INVENTOR
George E. Pritchard
BY
ATTORNEYS

G. E. PRITCHARD.
PEA THRESHER AND HARVESTER.
APPLICATION FILED DEC. 29, 1913.

1,117,904.

Patented Nov. 17, 1914.
3 SHEETS—SHEET 2.

WITNESSES

INVENTOR
George E. Pritchard
BY
ATTORNEYS

G. E. PRITCHARD.
PEA THRESHER AND HARVESTER.
APPLICATION FILED DEC. 29, 1913.
1,117,904.
Patented Nov. 17, 1914.
3 SHEETS—SHEET 3.
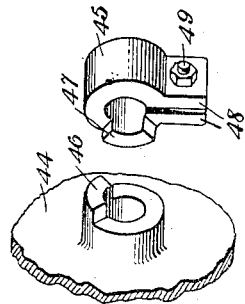
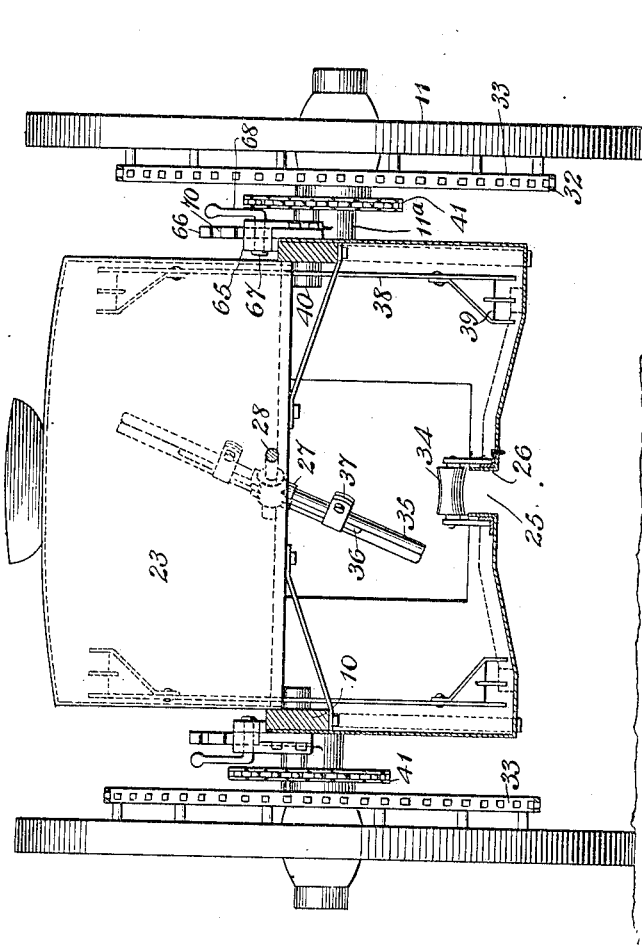
WITNESSES
INVENTOR
George E. Pritchard
BY
ATTORNEYS

UNITED STATES PATENT OFFICE.

GEORGE EDWARD PRITCHARD, OF LILLY, NORTH CAROLINA.

PEA THRESHER AND HARVESTER.

1,117,904.   Specification of Letters Patent.   Patented Nov. 17, 1914.

Application filed December 29, 1913. Serial No. 809,240.

*To all whom it may concern:*

Be it known that I, GEORGE E. PRITCHARD, a citizen of the United States, and a resident of Lilly, in the county of Camden and State of North Carolina, have invented a new and Improved Pea Thresher and Harvester, of which the following is a full, clear, and exact description.

My improved machine, while capable of other uses, is more particularly designed for threshing and harvesting peas.

The invention relates to a machine adapted to be drawn over the field and provided with suitable guide elements to direct the vines of a row properly to the machine, there being a beater turning transversely, or approximately so, to the direction of travel to strip and thresh the peas, a novel arrangement of raking elements and forks being so disposed and driven as to cause the threshed peas to be delivered rearwardly into a suitable receiving chamber at the rear of the vehicle.

The invention will be particularly explained in the specific description following.

Reference is to be had to the accompanying drawings forming a part of this specification, in which similar characters of reference indicate corresponding parts in all the views.

Figure 1:
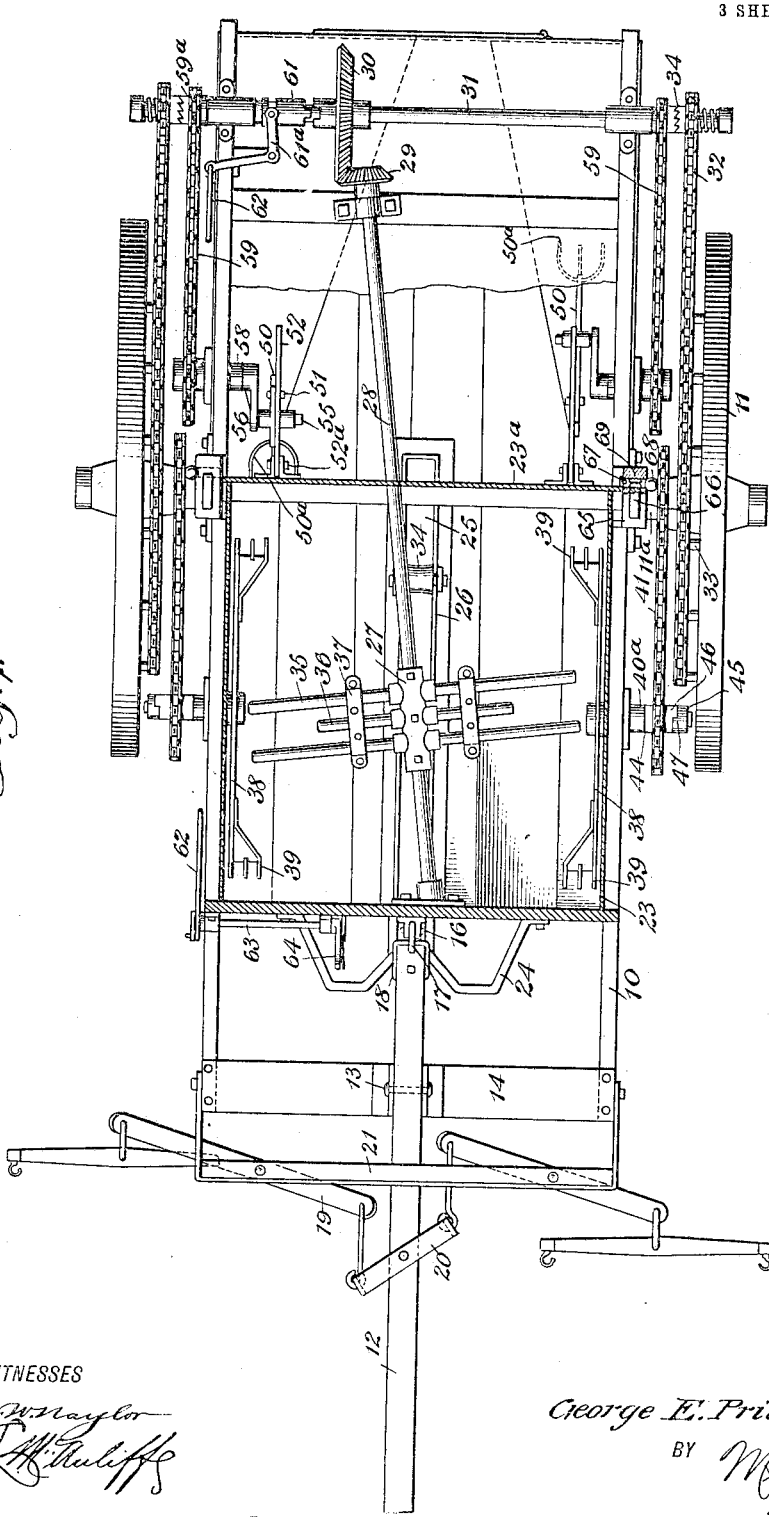
Figure 2:
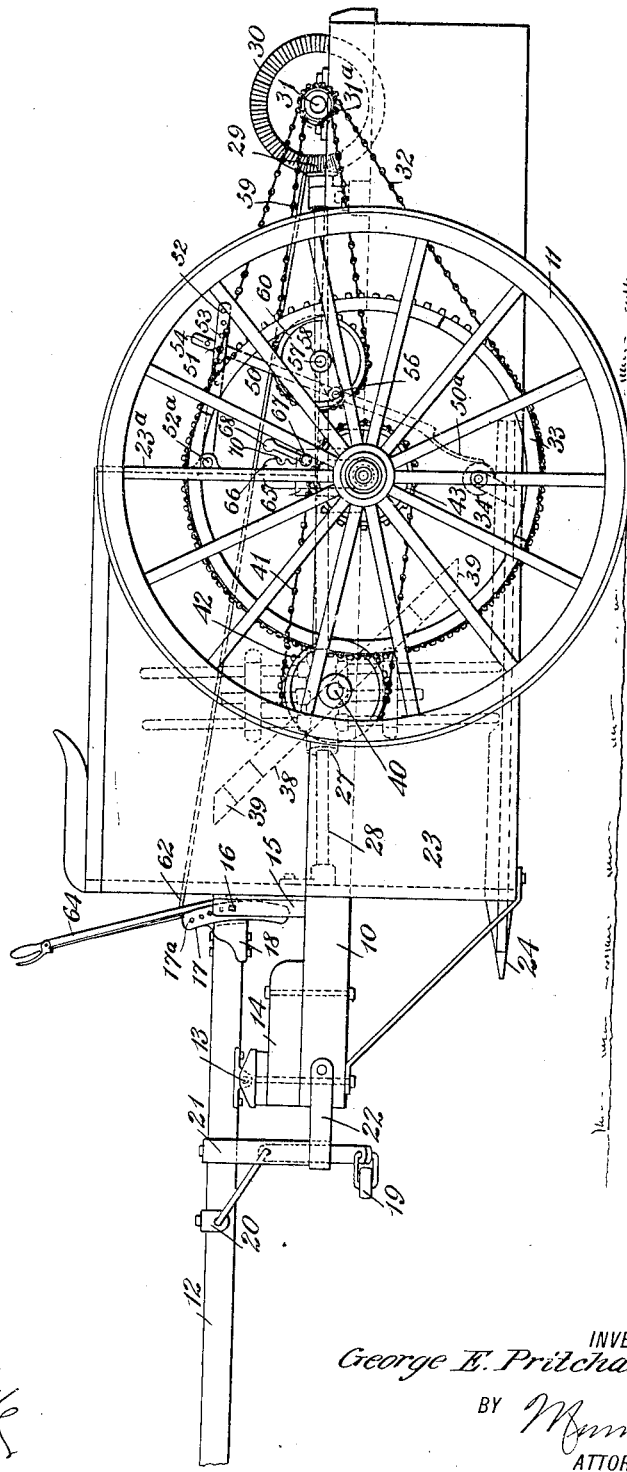

Figure 1 is a plan view of a thresher and harvester embodying my invention, portions of the box or body being broken away and other parts thereof being shown in section; Fig. 2 is a side elevation of the machine; Fig. 3 is a transverse vertical section; and Fig. 4 is a fragmentary detail showing the driving connection for the rakers.

In constructing a practical embodiment of my invention in accordance with the illustrated example, a suitable frame 10 is provided, having running wheels 11 and a draft tongue 12. The tongue is shown as pivoted at 13 on a front cross bar 14 of the frame 10. The rear end of the tongue is adjustably connected with the frame 10, there being a socket 15 on said frame through which a bolt 16 passes, the bolt passing also through any one of a series of holes 17ª in a head 17 formed on an end fitting 18 of the tongue. Any suitable arrangement of draft trees, generally designated by the numeral 19 is provided, the same including a central bar 20 pivoted on the tongue 12 and members pivoted on a cross bar 21 secured by its arms 22 to the forward end of the frame 10.

A box 23 is mounted on the frame, and at the bottom thereof, at the front, guides 24 project forwardly for directing the vines of a row of peas or the like, to a guide slot or opening 25 which extends rearwardly in the box, the slot being defined by suitable flanges 26 on the bottom of the box. A beater or threshing head generally designated by the numeral 27, is mounted to be rotated transversely of the general direction of travel, and preferably at a slight angle to the slot 25. Said threshing head is mounted on a shaft 28, turning in suitable bearings and ranging diagonally across the bottom of the box adjacent to the guide slot 25. The shaft is suitably driven from running wheels, use for this purpose, in the illustrated example, being made of a beveled miter pinion 29 on the said shaft, which meshes with a miter gear 30 on a transverse shaft 31 suitably journaled on the box 23, near the rear end, the said shaft having sprocket pinions 31ª over which chains 32 pass, said chains passing also around sprocket wheels 33 rigid on the running wheels 11.

By the described construction the vines or stalks guided to the slot 25 of the box 23, will be acted upon by the thresher head 27, and the peas will be thrown to the sides of the box. In the relatively rearward movement of the vines in the guide slot 25, they will, after passing the thresher head 27, be engaged by a horizontal roller 34 disposed transversely of the said guide slot, near the rear end of the latter, so that in the continued forward movement of the machine, the vines will be deflected downwardly and be passed over by the machine. Said roller 34 desirably, is concaved at the periphery. The thresher head is formed of transverse rods or fingers 35, 36, which project laterally at opposite sides of the shaft 28, there being advantageously three fingers at each side of tne shaft, the intermediate finger 36 being shorter than the side fingers 35.

To remove the threshed peas thrown to the bottom of the box 23 by the thresher head, I provide revolving rakers 38, presenting opposite arms terminating in suitable rake heads 39 that move in a rotary path adjacent to the bottom of the box. The rakers are turned in a direction to throw the peas in a rearward direction along the bottom of the box. Since the devices at each side are alike, it will suffice to describe those at one side only. The raker 38 is mounted on a shaft 40 turning in bearings 40ª, provided on the box, the shaft being driven in the present instance by a chain 41, which passes around the sprocket wheel 42 on the shaft 40, and around a sprocket wheel 43 turning with the adjacent running wheel 11.

In order to make provision for the operator to give a partial turn to the raker 39 independently of its driving means, the sprocket wheel 42 is mounted on a hub 44 loose on the shaft 40, and a collar 45 is clamped to the shaft, said hub and collar being provided respectively, as best seen in Fig. 4, with clutch lugs 46, 47. The lugs are so proportioned that the turning of the sprocket wheel 42 by the chain 41 in one direction, will cause the lug 46 to engage the mating lug 47 and thus turn the shaft 40 of the raker 38; but the raker and its shaft may be manually given a partial turn in the same direction, independently of the hub 44 and its lug 46. The purpose of thus manually turning the rakers is to provide for so positioning the rake heads 39, as to dispose them above the bottom of the box, regardless of the position in which they may be left when the machine is stopped, and thus the operator may employ a hoe, or a hand rake, if desired, to clear out the peas beneath the raker. The clamp collar 45 is formed with lugs 48 receiving a bolt 49, so that the collar is held only friction tight on the shaft 40; thus should the raker 38 become clogged and be strained, no breakage will occur, because the collar 45 will slip on the shaft.

Rearward of the rakers 38, I provide at each side, forks 50 to carry the peas which are thrown rearward by the rakers farther back to the rear end of the box 23, which constitutes a receptacle for the peas. Each fork 50 is pivoted near its upper end, as at 51, to a rearwardly extending arm 52, the arm being itself pivoted at one end, as at 52ª to any convenient partition or transverse member 23ª of the box 23.

The arm 52 and the fork 50 are formed respectively with a series of holes 53, 54, for variously receiving the pivot 51 whereby to adjust the throw of the fork. The lower free end of the fork is provided with suitable tines 50ª, and at a point between the ends of the fork the latter is pivoted to a wrist pin 55, on a crank arm 56 of a shaft 57. Said shaft turns in bearings 58 on the box 23, and a sprocket chain 59 runs over a sprocket wheel 60 on said shaft, and over a sprocket wheel at 59ª on the transverse shaft 31. The arrangement is such that the shaft 58, through its crank arm 56 and wrist pin 55, will actuate the forks 50, causing the tines thereof to have rearward movement adjacent to the bottom of the box to throw the peas to the rear end of the box.

In order to throw the thresher head 27 into and out of action the miter pinion 30 is loose on the shaft 31, and the clutch sleeve 61 is slidable into engagement with the hub of the said miter gear, by a bell crank lever 61ª, which is connected by a rod 62 to a rock shaft 63 having a hand lever 64.

In addition to the described elements 15, 16 and 17, for relatively adjusting to tongue 12 and frame 10 vertically, the stud axles 11ª are adjustable vertically relatively to the box 23. Each of said stud axles 11ª has a vertically projecting post 66, which is received slidably in a bracket or fitting 65 on the side of the box 23, and a rockable pin 67 having a handle 68, is mounted in said bracket, and is adapted to engage in any one of a vertical series of recesses 70 in the post 66. To engage and disengage the pin 67 and post 66, said pin has a flattened or depressed side, as indicated at 69 in Fig. 1, so that the rocking of the pin will effect the necessary engagement or disengagement.

It will be apparent that by so mounting the thresher head as to rotate in a plane diagonal to the guide slot 25, the said head may be provided with longer thresher arms than if the head rotated in a plane perpendicular to the sides of the box 23, and moreover, the revolving head will present an increased effective width to the vines.

By the described arrangement the rakers and forks, it will be seen, constitute a feed means of compact form and operate to effect the rearward movement of the threshed product as rapidly as it is received from the thresher device. By constructing and arranging the rakers as described, with their rapidly revolving radiating arms, they afford a minimum obstruction to the threshed peas thrown laterally by the threshing device, and they effectively prevent an accumulation at the sides of the threshing device such as would clog or interfere with the latter. The vibrating motion of the forks 50 produces an essentially parallel movement along the bottom of the box, to carry rearward the peas threshed by the rakers, and they have a pitching action at the end of the parallel movement, the forks rising and then dropping to the rearward position.

Having thus described my invention, I claim as new and desire to secure by Letters Patent:

1. In a thresher and harvester, a vehicle having a receptacle provided with a guide to direct vines or stalks to the receptacle, a transversely revoluble thresher, a feed device at a side of the thresher positioned to receive the threshed product from said thresher, and an additional feed device rearward of the first feed device and receiving the material from the latter.

2. In a thresher and harvester, a vehicle having a receptacle, a driven, transversely revoluble thresher, there being a guide to direct vines or stalks to the receptacle, feed means at the sides of the receptacle, said feed means comprising rakers revolving adjacent to the thresher and in planes at an angle to the plane of rotation of the thresher, and additional feed means rearward of the revolving rakers and to which said rakers deliver.

3. In a thresher and harvester, a vehicle having a receptacle, a transversely revoluble thresher therein, a feed device at the side of the thresher mounted to revolve in a plane at an angle to the plane of rotation of the thresher and adapted to receive the threshed product from said thresher, and a vibrating feed device rearward of the revolving feed device and receiving the material from the latter.

4. In a thresher and harvester, a vehicle having a receptacle, a transversely revoluble thresher therein, a feed device at a side of the thresher adapted to receive the threshed product from said thresher, and a vibrating feed device rearward of the first feed device and receiving the material from the latter.

5. In a thresher and harvester, a vehicle having a receptacle, a transversely revoluble thresher therein, and feed devices arranged in succession at a side of the receptacle, the rearmost feed device comprising a vibrating fork having a parallel movement along the bottom of the receptacle, and lifting and dropping movements.

6. In a thresher and harvester of the character described, a vehicle having a receptacle, a thresher device operating in the receptacle, and feed means to feed the threshed products received from the thresher, said feed means comprising revolving radiating arms and a drive therefor, the arms being free to be given a partial turn independently of the drive, to afford clearance beneath the arms.

7. In a thresher and harvester, a vehicle having a receptacle, a guide to direct vines or stalks to the receptacle, and a revolving thresher disposed diagonally to the said guide.

8. In a thresher and harvester, a vehicle having a receptacle, and a driven, transversely revolving thresher device, there being a guide to direct vines or stalks to the receptacle, and a driven raker in the receptacle at a side of the thresher device, said raker comprising raker arms carrying raker heads and mounted to revolve on a transverse axis.

In testimony whereof I have signed my name to this specification in the presence of two subscribing witnesses.

GEORGE EDWARD PRITCHARD.

Witnesses:
GEO. H. RIGGS,
N. L. HALSTEAD.